United States Patent [19]

Kocsanyi et al.

[11] Patent Number: 4,869,460

[45] Date of Patent: Sep. 26, 1989

[54] ACTUATING DEVICE FOR PIPE-CHAMBER FEEDERS OF HYDRAULIC TRANSPORT EQUIPMENTS

[75] Inventors: Laszlo Kocsanyi; Karoly Illes; Laszlo Ajtai, all of Budapest, Hungary

[73] Assignees: Heves Megyei Tanacsi Epitoipari Vallalat; Kozponyi Banyaszati Fejlesztesi Intezet, both of Hungary; a part interest

[21] Appl. No.: 105,304

[22] PCT Filed: Dec. 29, 1985

[86] PCT No.: PCT/HU85/00080

§ 371 Date: Aug. 28, 1987

§ 102(e) Date: Aug. 28, 1987

[87] PCT Pub. No.: WO87/04224

PCT Pub. Date: Jul. 16, 1987

[51] Int. Cl.[4] ........................................... F16K 31/122
[52] U.S. Cl. ........................................ 251/62; 251/25; 91/407
[58] Field of Search ................ 251/62, 55, 35; 91/407

[56] References Cited

U.S. PATENT DOCUMENTS

| 1,861,742 | 6/1932 | Hand | 251/55 X |
| 2,000,297 | 5/1935 | Putnam | 251/35 X |
| 2,211,318 | 8/1940 | Lamerota | 251/62 X |
| 2,694,544 | 11/1954 | Hall | 251/35 |

FOREIGN PATENT DOCUMENTS 2277285 1/1976 France ................................. 251/62

*Primary Examiner*—Arnold Rosenthal
*Attorney, Agent, or Firm*—Handal & Morofsky

[57] ABSTRACT

An actuating device for pipe-chamber feeders of hydraulic transport equipments comprising valves or other closing appliances having a closing element that is movable reciprocally between an open and a closed position, the improvement being characterized in said closing element being associated with at least one speed control means, especially a speed reducing means acting at least at the end phase of the closing stroke of said closing element.

The speed reducing effect of at least one of said speed control means may be adjustable.

6 Claims, 3 Drawing Sheets

ACTUATING DEVICE FOR PIPE-CHAMBER FEEDERS OF HYDRAULIC TRANSPORT EQUIPMENTS

FIELD OF INVENTION

The present invention relates to an improved actuating device for pipe-chamber feeders of hydraulic transporting and hoisting equipments adapted to convey solid materials such as coal or slag in the form of slurry. Such actuating devices generally contain valves and other closing appliances and the invention mainly relates to the speed-controlled actuation of closing elements of these appliances.

BACKGROUND OF THE INVENTION

The function of a pipe-chamber feeder consists of the periodical alternate filling of the chambers with slurry at low pressure, and emptying them at high pressure. While performing this function, the closing appliances, especially valves or sliding valves must be opened and closed by a suitable actuating device in a certain sequence and at short time periods, most advantageously in a manner as it is described in the Hungarian Patent Specification No. 160 526. However, the closing elements of the valves have to be moved slowly because a quick closing would cause disadvantageous pressure and velocity fluctuations, even heavy water impacts that are called water hammer in the art concerned.

Consequently, in prior art devices the change-over or switch-over steps i.e. the closing and opening of the valves are relatively slow and they result in a disadvantageous decrease of the performance of transport equipments having only two pipe chambers. In such equipments every change-over consists at least of two opening and closing steps, and during the change-over operations filling or emptying of the pipe chambers is not possible.

If three or more pipe-chambers are used there is no such decrease of the output. However, investment and operating costs of equipments having three or more pipe-chambers are much too high. In addition to this, a diminishing of the time necessary for the switch-over steps is still desirable even if the number of pipe-chambers is more than two.

The fact that the change-over steps in the known prior art hydraulic transport equipments are extremely time-consuming is specially disadvantageous with large-size equipments because the speed of actuation of the closing elements of big closing appliances is very slow, and also the pressure-changes in the large pipe-chambers take much time.

SUMMARY OF THE INVENTION

Main object of the invention is to greatly diminish the decrease of output caused by the slow actuation of the valves in known hydraulic transport equipments, especially in those, having two pipe-chamber feeders, and to attain that even if largest closing elements having a closing stroke as long as 300 to 600 mm are used, practically no loss in capacity or performance should occur by the change-over operations. Simultaneously, of course, water impacts should also be avoided.

These and other objects are attained by the present invention that results in that the closing element of the closing appliances especially closing elements of the main valves are quickly moved, say with a speed three or four times higher than up to now. Simultaneously with this, the closing appliances contain one or more means for significantly reducing the speed of said closing elements at the end phase of their closing stroke i.e. just before arriving at their closed position. It may be important that the speed reducing effect should be adjustable and if one speed reducing throttling device is used only, this is preferred to be adjustable manually. If two or more simultaneously functioning throttle devices are employed, it is important that at least in one of them the throttling effect should be adjustable.

The slowing down of the closing element can be continuous or stepped.

COMPARISON OF THE INVENTION WITH THE PRIOR ART

There are well known hydraulic stroke-end brakes called cataracts in which the speed of a quickly moving piston or other part is slowed down at the end of its stroke by a fluid caused to stream through a narrow opening. However, such hydraulic stroke-end brakes have never been employed in valves of hydraulic transport equipments. Thus the basic idea of the invention consists of using such cataracts for increasing the output of such equipments.

It has been found that by using the invention, a hydraulic transport equipment having two pipe-chamber feeders will have a capacity which was attained up to now by very expensive three-chamber equipments only.

A further novel feature of the invention is that the throttling effect to be employed at the end of the closing stroke of the closing elements should be adjustable so as to be able to alter the slowing effect. In fact when designing the equipment in most cases it is not possible to predict the most advantageous throttling effect and thus the speed at the end of the closing stroke should be determined experimentally during the trial run of every equipment.

A further surprising effect of the invention lies in the following:

The sludge or slurry is filled in the pipe-chamber by means of a pump working with low pressure. During this necessary change-over periods this filling is interrupted. Consequently, in the known prior art equipments, if the sludge is continuously pumped into the sludge container, the solid particles contained tend to sedimentation during the period of change-over, and this may cause serious breakdowns. The quick change-over operation made possible by the invention is suitable to avoid such breakdowns.

SHORT DESCRIPTION OF THE DRAWINGS

FIG. 1 shows the typical closing characteristics of a slide valve that is commonly used for filling a pipe-chamber feeder. The figure illustrates that the initial flow resistance caused by closing is small and changes at the beginning of the closing stroke very little only, but it quickly increases towards the end of the closing stroke. The strongest throttling effect is employed at about the last 10% of the closing movement.

FIG. 2 diagramatically depicts an embodiment of the device according to the invention shown by way of example only, in which there is a means for adjusting the speed of the closing element provided, and there are included two further throttle valves for choking the flow of the braking fluid in two phases at the end-phase of the stroke.

FIG. 3 is a diagramatic sectional view of an oil-hydraulic cylinder adapted to drive the closing element of a closing appliance in a device according to the invention. In this embodiment the thrusting effect cannot be adjusted, so it is advantageous to use this type of speed reducing means in devices according to the present invention with at least one further throttling means, preferably throttle valve suitable to adjust the chocking effect manually.

DESCRIPTION OF A PREFERRED EMBODIMENT OF THE INVENTION

Figure 2:
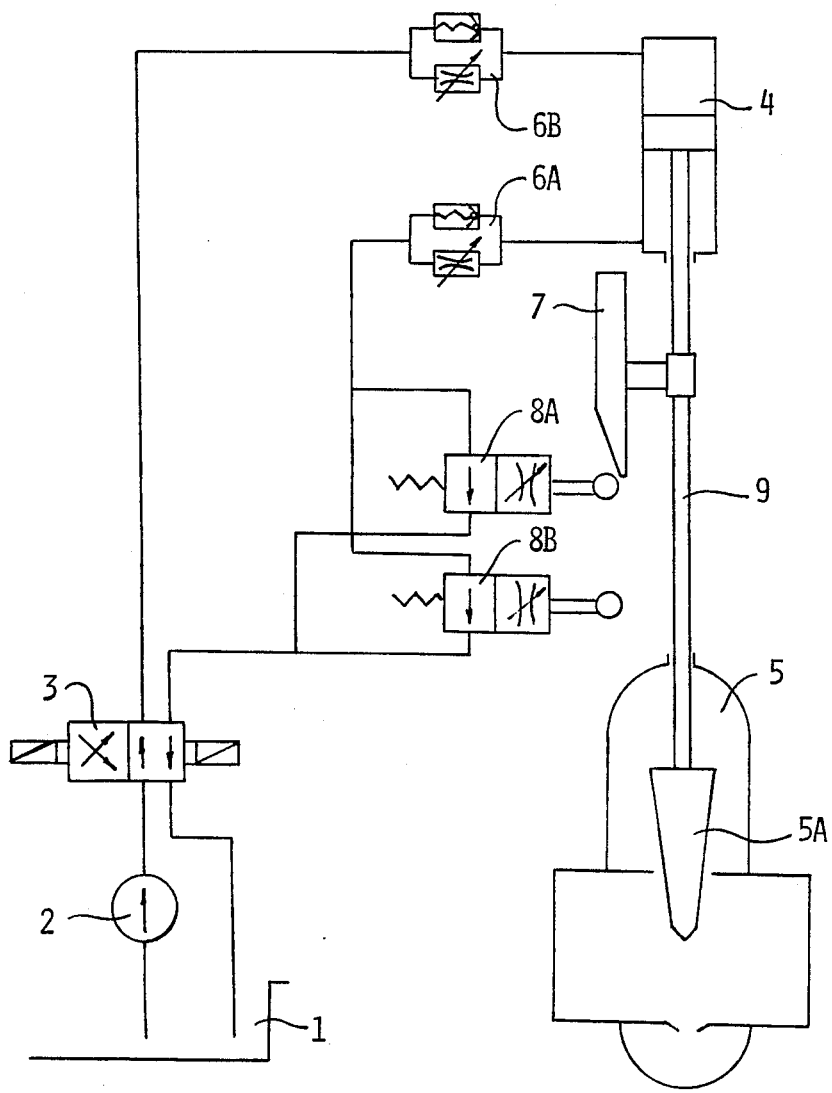

According to FIG. 2 a pump 2 supplies oil through a reversing valve 3 into the upper working chamber of a hydraulic cylinder 4 of the actuating device. The hydraulic cylinder 4 drives a closing element 5A of a closing appliance by means of a hydraulic piston and a piston rod 9. Since there is only a preliminary regulator 6B arranged in the pressure pipe of pump 2, only a very low throttling effect is produced and thus, the full oil pressure drives the piston of the hydraulic cylinder 4 with little resistance, so that the closing element is moved quickly. The preliminary regulator 6B is suitable to adjust the speed of the several closing elements if present in the device relatively to each other.

Oil pressed out from cylinder 4 streams through a preliminary regulator 6A which serves for exactly adjusting the quick movement speed of the piston. It is clear that the choking effect set by the preliminary regulators 6A and 6B is effective along the whole stroke of the piston. Oil leaving preliminary regulator 6A flows through further change-over throttle valves 8A and 8B which, in the position shown in the drawing, let through the oil practically without throttling. The oil leaving the change-over throttle valves 8A and 8B returns to the fluid tank 1 after passing again the reversing valve 3.

Figure 1:
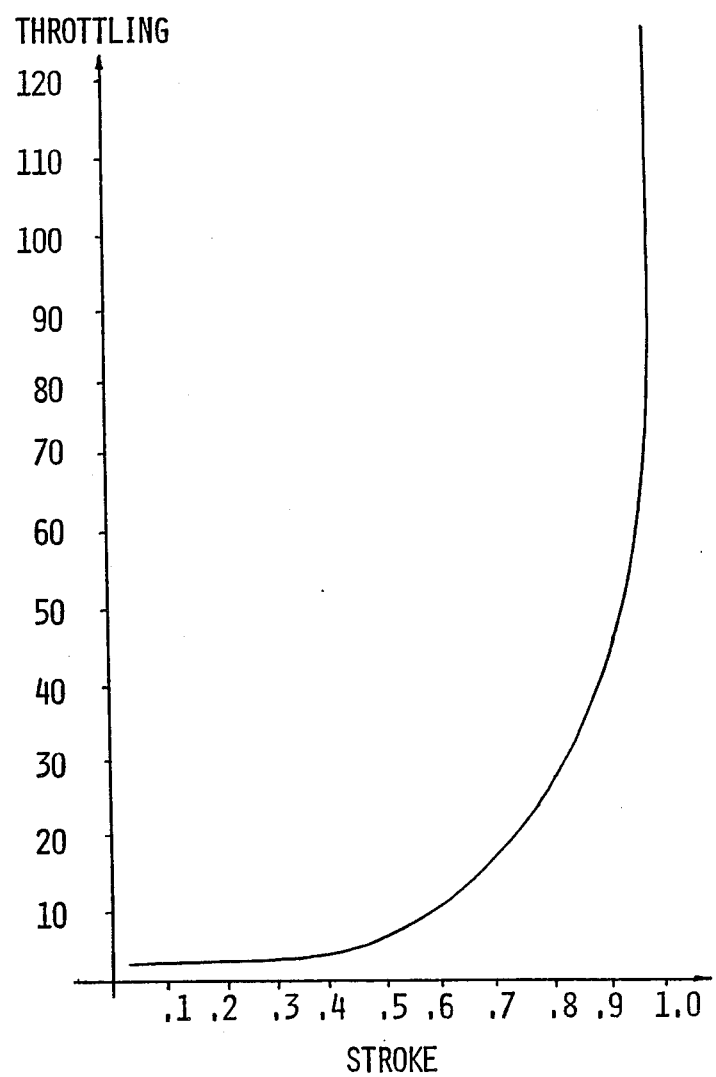

When the closing element 5A arrives near its closing position, a buffer 7 secured to the piston rod 9 reaches a control lever of the change-over throttle valve 8A and brings this valve against positive spring effect in its throttling position. Consequently the stream of oil coming from cylinder 4 is throttled by this valve 8A so that the speed of the closing element 5A is reduced. When said buffer 7 continues its movement it reaches the other change-over throttle valve 8B and it is also brought into its throttling position. As a result of this, the speed of movement of the closing element 5A becomes still slower. Since the resulting throttling effect is very closely adapted to the valve characteristics shown in FIG. 1 of the drawing, no water impact and no disadvantageous pressure fluctuation will occur upon closing.

Valves 8A and 8B can be regulated or adjusted in order to find a resulting choking effect that is most advantageous for the closing operation.

If the closing appliance is to be opened, the closing element 5A starts its movement with a slow speed because the oil streaming now in the opposite direction must pass through valves 8A and 8B that are in their throttling position. However, when the buffer 7 leaves the valves 8B and 8A, they are brought by means of springs in a few seconds sequence in their non-throttling positions so that the opening movement of the closing means is speeded up to its full speed.

From the above description it is clear that the device is suitable for adjusting the speed of the closing element in the vicinity of its closing position to a certain maximum value of velocity at which water impacts and similar harmful effects are surely avoided. Along the remaining part of the stroke, however, the speed can be set of a value equal to a multiple of said speed. Consequently the change-over operation of the pipe-chamber feeder takes a very short time period only.

Instead of the above described mechanical device also an electronic embodiment may be employed for instance in a way that the buffer 7 on the piston rod 9 controls an electric or electronic switch which in turn causes a change-over of a valve or of valves. It has already been proposed to move the closing elements by means of electromagnets instead of a hydraulic piston, and according to the invention, also in such embodiments it is possible to control the speed of movement of the closing element in a manner that a strong electromagnet first quickly drives the closing element at the beginning of its closing stroke and at the end-phase of its closing stroke near the valve seat the speed of this element is reduced.

DESCRIPTION OF A SECOND PREFERRED EMBODIMENT

Figure 3:
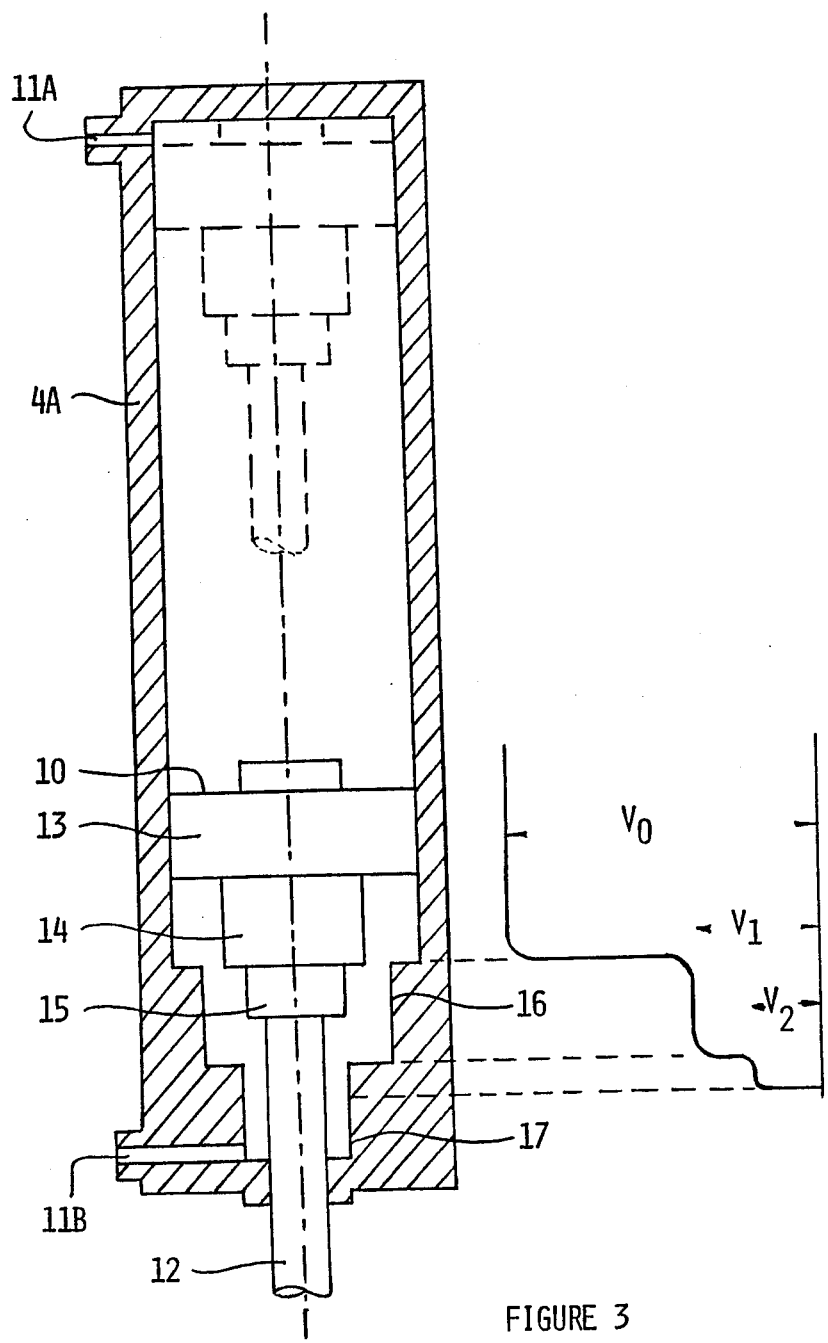

According to FIG. 3 a plunger body 13 and a piston rod 12 of a hydraulic piston 10 are arranged in a cylinder 4A with sliding fit. Two extensions 14 and 15 situated between said plunger body 13 and said piston rod 12 have a smaller diameter than the inner diameters of stepped portions 16 and 17 of the hydraulic cylinder 4A respectively. The stepped portions 16 and 17 are made in that end part of the hydraulic cylinder 4A which is turned towards the closing element to be actuated which is not shown in FIG. 3 but can be clearly seen in FIG. 2.

The position of the piston 10 shown in FIG. 3 in dotted lines corresponds to its end position in which the closing element not shown in FIG. 3 /and driven by the hydraulic piston/ is in its fully opened position. If now the hydraulic fluid is fed into the hydraulic cylinder 4A through inlet channel 11A, the piston starts its closing movement with a very high speed, because the oil on the other side of the hydraulic piston 10 may leave through a chanel 11B practically unthrottled. The speed of the hydraulic piston 10 is shown by $V_o$ in the diagram of FIG. 3.

When the hydraulic piston 10 attains the position shown in full in FIG. 3, throttling of the flow of oil begins, because in course of the further movement of the hydraulic piston 10 the oil is compelled to pass through the narrow cylindric interspace between the extention 14 and the first stepped portion 16 of the hydraulic cylinder 4A. Streaming through this cylindrical interspace means a certain throttling of the flow and thus, the speed of the piston is reduced to a value $V_1$ as shown in the above mentioned diagram in FIG. 3 of the drawing.

When the hydraulic piston 10 continues its stroke of travel, also the second extension 15 comes into the area of the second stepped portion 17 and as a result, a double throttling effect occurs. The speed of the hydraulic piston 10 further diminishes to the value $V_2$, so that the closing movement of the closing element driven by the hydraulic piston 10 is accomplished by a slow speed as generally required in hydraulic transport equipments. Of course, for performing the above ask, channel 11B opens into the very end portion of the hydraulic cylinder 4A i.e. it joins the narrowest end section of said cylinder 4A.

If the closing element connected to the piston rod 12 is to be opened the high pressure oil enters the hydraulic cylinder 4A through the chanel 11B and initially a double throttling effect prevails. After a short time the oil streams under single throttling resistance only, and when the piston 13 arrives to the position shown in full lines in FIG. 3, it continues its movement under full pressure and with maximal speed $V_o$.

The invention is not limited to the two stepped throttling embodiment as described above by way of example only. In some cases a single throttling can be sufficient or, on the contrary even more than two steps are necessary.

Since the device as shown in FIG. 3 of the drawing cannot be adjusted manually to the best throttling effect, it is advantageous to combine this embodiment with at least one further adjustable throttling device.

We claim:

1. An improved actuating device for pipe-chamber feeders of hydraulic transport equipment, said actuating device comprising valves or other closing appliances having a closing element that is movable reciprocally between an open and a closed position by a hydraulic piston that is moved in a hydraulic cylinder, said closing element being associated with a plurality of throttling means adapted to have a speed reducing effect that increasingly reduces the speed of said closing element as it more nearly approaches its closed position, the speed reducing effect of at least one of said throttling means being adjustable as to its initial and ultimate throttling effect and comprising a throttle valve, that is inserted into at least one pipe-line feeding or leading away hydraulic fluid into or out from said hydraulic cylinder and said throttling means being activated in sequence by an activating member associated with a piston rod connecting said hydraulic piston and said closing member.

2. An improved actuating device for pipe chamber feeders of hydraulic transport equipment, said actuating device comprising valves or other closing appliances having a closing element that is movable reciprocally between an open and a closed position by a hydraulic piston that is moved in a hydraulic cylinder, said closing element being associated with at least one adjustable and variably throttling means adapted to have a speed reducing effect that increasingly reduces the speed of said closing element as it more nearly approaches its closed position, the speed reducing effect of said at least one adjustable and variably throttling means being adjustable as to its initial and ultimate throttling effect and comprising a throttle valve that is inserted into at least one pipe-line feeding or leading away hydraulic fluid into or out from said hydraulic cylinder, and an adjustable constant throttling means being also associated with the hydraulic pipelines.

3. An improved actuating device as claimed in claim 2, wherein said constant throttling means affects flow in the hydraulic pipelines only in one direction.

4. An improved actuating device as claimed in claim 2, wherein said at least one throttling means being adjustable manually.

5. An improved actuating device as claimed in claim 2 wherein the throttling effect of said at least one throttling means is effective substantially over the whole stroke of said closing element.

6. An improved actuating device as claimed in claim 1, wherein the activating member has a contoured activating surface, the contour of which controls the rate of change from the initial to the ultimate throttling effect of said adjustable variably throttling means activated by said activating member.

* * * * *